May 7, 1940.    J. ERB    2,199,589
APPARATUS FOR SLICING MEAT
Filed May 5, 1939    2 Sheets-Sheet 1
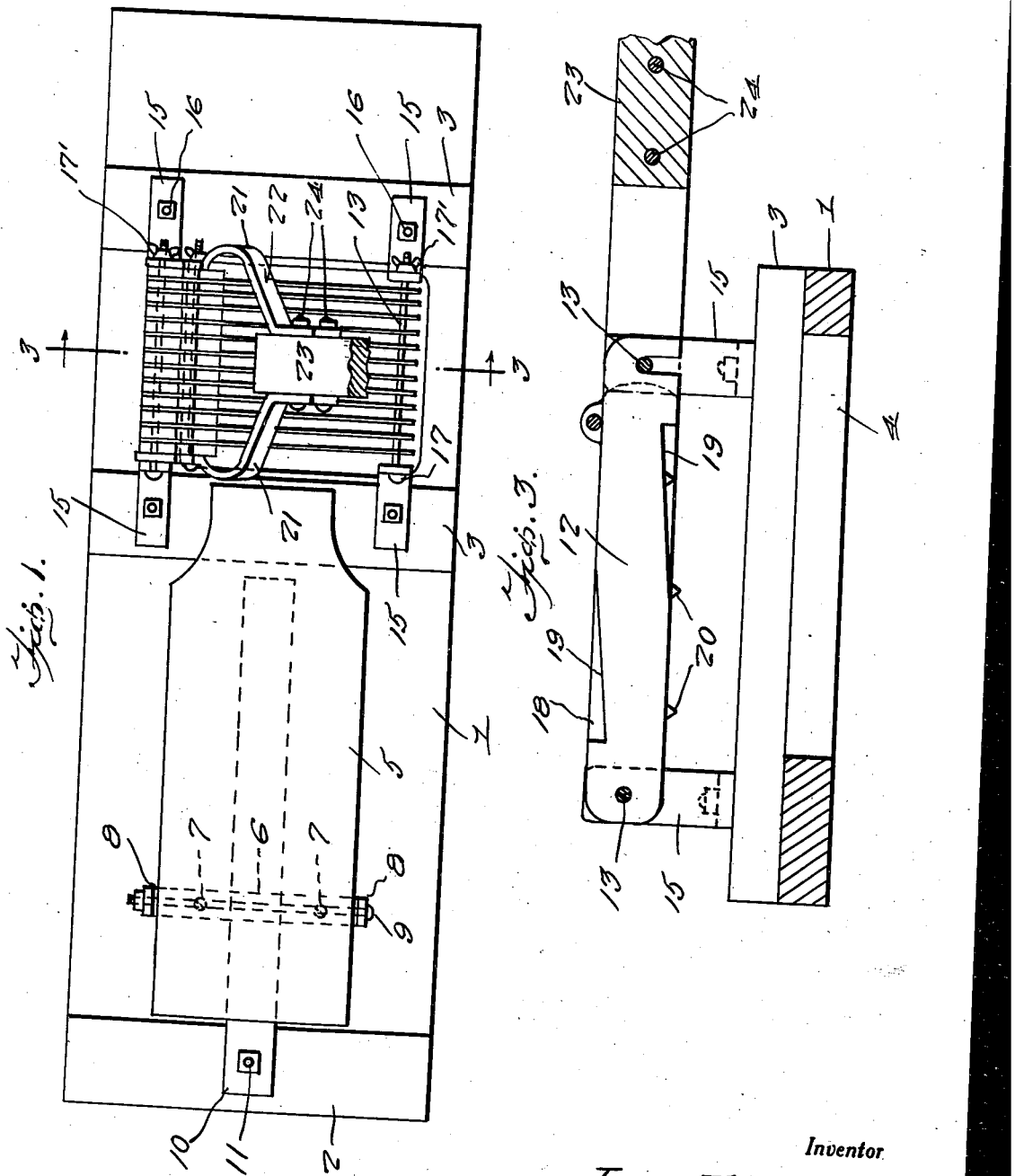
Inventor
Jay Erb
By Clarence A. O'Brien
and Hyman Berman
Attorneys

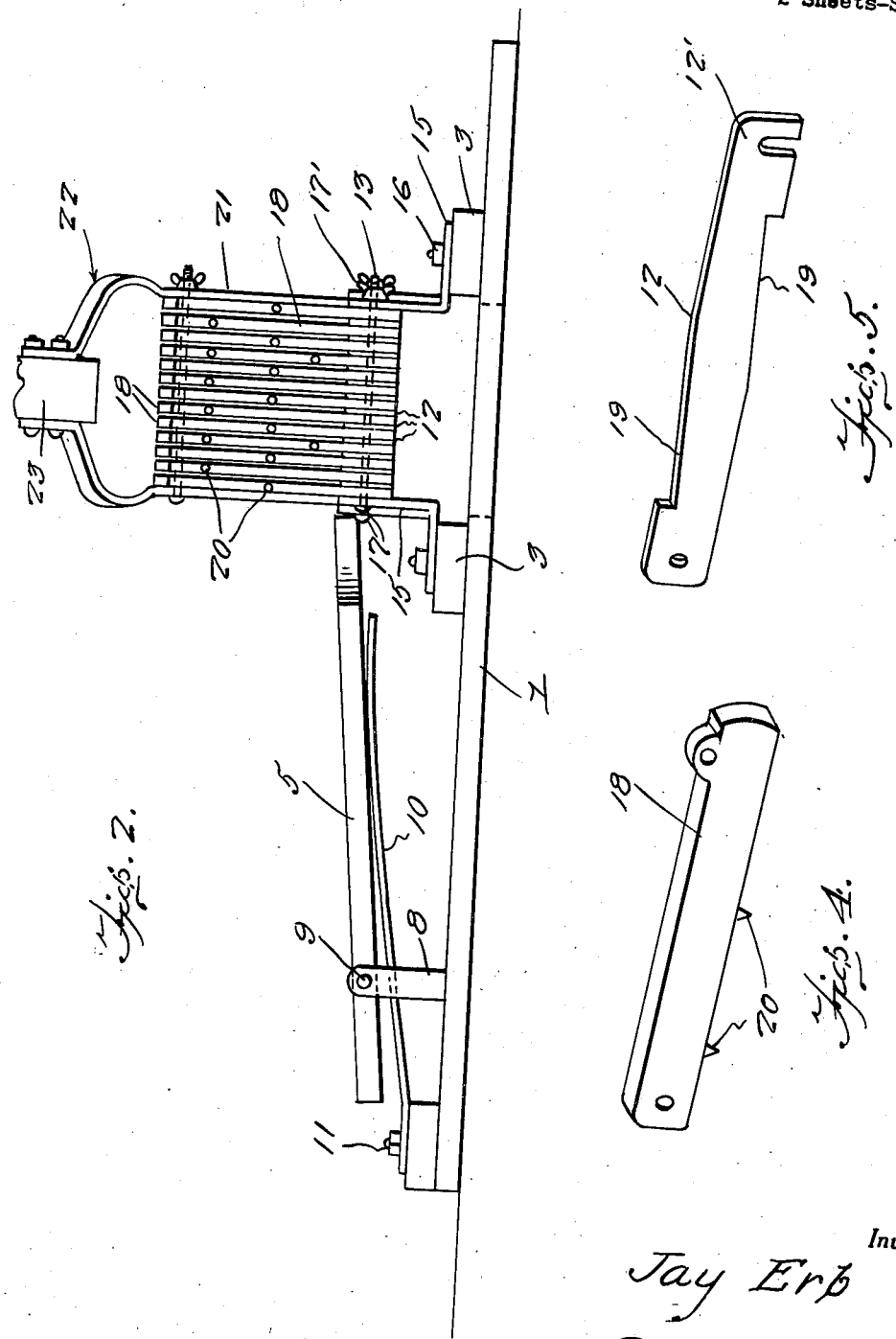

Patented May 7, 1940

2,199,589

UNITED STATES PATENT OFFICE 2,199,589

APPARATUS FOR SLICING MEAT

Jay Erb, Green Springs, Ohio

Application May 5, 1939, Serial No. 272,043

1 Claim. (Cl. 146—168)

My invention relates to improvements in apparatus for slicing meat more particularly lard fat and the like.

The invention is designed with the particular purpose in view of providing an inexpensive, easily operative, apparatus for slicing meat or lard fat into uniformly thin slices for frying out to make lard.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a view in top plan of the preferred embodiment of my invention.

Figure 2 is a view in front elevation,

Figure 3 is a view in transverse section taken on the line 3—3 of Figure 1 loooking in the direction indicated by the arrows and drawn to an enlarged scale.

Figure 4 is a view in perspective of one of the shearing bars, and

Figure 5 is a similar view of one of the cutting bars.

Referring to the drawings by numerals, the illustrated embodiment of my apparatus comprises an elongated rectangular base 1, preferably a heavy plank of wood, which may be supported in any suitable manner in properly elevated position as by legs, not shown. A heavy cleat 2, also preferably of wood, is secured transversely of said base on top thereof and at one end of the same. A pair of similar cleats 3 are secured to the top of the base 1 transversely thereof and in laterally spaced relation adjacent the opposite end of the base. The cleats 2 and 3 may be nailed to the base 1 or fixed thereto in any other desired manner. Between the pair of cleats 3 a suitable discharge aperture 4 is provided in the base 1 for the sliced meat to drop through.

Extending endwise between the end cleat 2 and the adjacent cleat 3 of said pair is a feed board 5 in the form of an elongated plank somewhat narrower than the base 1. The feed board 5 is mounted for vertical swinging movement on the base 1. For this purpose a U-shaped metal bracket 6 is suitably secured on top of the base 1, as at 7, with upstanding arms 8 embracing the sides of said board. A rod 9 is extended through the board 5 transversely thereof and adjacent the outer end of the board, the ends of said rod being suitably anchored detachably in the arms 8. A leaf spring 10 bolted at one end, as at 11, to the top of the end cleat 2 extends between the arms 8 and bears against the bottom of the board adjacent the inner end of the same, said spring urging said board into a slightly inwardly and upwardly inclined position. The inner end of the board 5 overhangs the innermost cleat 3 of the pair. The pair of cleats 3 serves to support therebetween a battery of elongated cutting bars 12 of suitable metal exteending lengthwise transversely of the base 1 in equidistantly spaced relation, the spacing being such as to provide for cutting the meat, or fat, in thin slices. A pair of rods 13 extend through opposite ends of the cutting bars 12, said rods being supported at the ends thereof in angle brackets 15 bolted, as at 16, to the tops of the cleats 3. Preferably the rods 13 are equipped with a head 17 at one end and a wing nut 17' at the other for securing the same in the brackets 15.

For forcing the meat into the cutting bars 12, a presser head is provided comprising an assembly of shearing bars 18 disposed side by side with corresponding ends thereof pivoted on one of the rods 13 so that said bars may be swung upwardly to clear the cutting bars 12 or downwardly to receive said cutting bars therebetween in alternating relation. The spacing of the shearing bars 18 is such that when they are swung downwardly, the cutting bars 12 fit between the same with a slight clearance for freedom of action. The length of the shearing bars 18 is such that they may be lowered parallel with the cutting bars 12. The cutting bars 12 are provided with oppositely inclined top and bottom cutting edge portions 19 for facilitating a shearing action in cutting. The bottom edges of the shearing bars 18 are provided with studs 20 serving to spike the meat and to thereby prevent it from slipping under the pressure of the shearing bars. Corresponding ends of the cutting bars 12 may be notched, as at 12', to straddle one rod 12 so that said bars may be swung upwardly on the other rod 12 for cleaning purposes.

For vertically swinging the shearing bars 18 said bars are suitably secured between the side arms 21 of a suitable yoke 22, said arms being swingable vertically on the same rod 13 on which the bars 12 and 18 are swingable and having a hand lever 23 bolted, as at 24, thereto.

Referring now to the use and operation, normally the feed board 5 is inclined under the urge of the spring 10 so that its inner end is elevated slightly above the cutting bars 12. With the hand lever 23 elevated into a position such that the shearing bars 18 are raised clear of the cutting bars 12, the meat is placed on the feed board 5 and shoved onto the assembly of cutting bars 12, sufficient pressure being exerted downward to press said board 5 down so that the meat may be slid off the same onto said bars 12 conveniently. The shearing bars 18 are then lowered by means of the lever 23 thus forcing the meat through the cutting bars 12 and slicing the same in a manner which will be apparent. Sliced meat falls from the cutting bars 12 through the aperture 4 to be caught in a suitable receptacle. The tendency of the feed board 5 to spring upward when pressure thereagainst is released facilitates tearing or severing a chunk of the meat being sliced from the main piece.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

Apparatus for slicing meat comprising a base of rectangular form having a discharge aperture therein adjacent one end thereof, and assembly of elongated cutting bars mounted on said base to extend lengthwise transversely thereof over said aperture in laterally spaced relation and in a common plane above said base, a handle-bar, a presser assembly of spaced shearing bars at one end of said handle bar pivotally mounted on said base for vertical swinging movement into and out of the plane of said cutting bars and fitting between the latter, a feed board pivotally mounted, adjacent one end, on said base and extending upwardly toward the assembly of cutting bars, with its other end closely adjacent the cutting bars and a little above the plane of the upper cutting edges of the cutting bars, and spring means normally maintaining the feed table in said upwardly inclined position for downward movement under pressure to substantially the level of said cutting bars in feeding meat therefrom to said cutting bars and for reaction upwardly upon release of such pressure to move meat thereon clear of said presser assembly during upward swinging of the latter.

JAY ERB.